United States Patent
Hirami et al.

(10) Patent No.: US 10,955,431 B2
(45) Date of Patent: Mar. 23, 2021

(54) AUTOMATIC ANALYSIS DEVICE WITH SYRINGE PUMP

(71) Applicant: Hitachi High-Technologies Corporation, Tokyo (JP)

(72) Inventors: Kenichi Hirami, Tokyo (JP); Hajime Yamazaki, Tokyo (JP); Hidemi Koike, Tokyo (JP); Eriko Otsu, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 16/623,419

(22) PCT Filed: Jul. 3, 2018

(86) PCT No.: PCT/JP2018/025138
§ 371 (c)(1),
(2) Date: Dec. 17, 2019

(87) PCT Pub. No.: WO2019/044160
PCT Pub. Date: Mar. 7, 2019

(65) Prior Publication Data
US 2020/0124632 A1    Apr. 23, 2020

(30) Foreign Application Priority Data
Aug. 30, 2017 (JP) .............................. JP2017-164959

(51) Int. Cl.
*G01N 35/10* (2006.01)
*B01L 3/02* (2006.01)
*G01N 35/04* (2006.01)

(52) U.S. Cl.
CPC ............ *G01N 35/10* (2013.01); *B01L 3/0217* (2013.01); *G01N 2035/0434* (2013.01)

(58) Field of Classification Search
CPC .............................. G01N 35/10; B01L 3/0217
See application file for complete search history.

(56) References Cited

U.S. PATENT DOCUMENTS

| 4,941,808 A | 7/1990 | Qureshi et al. |
| 5,366,904 A | 11/1994 | Qureshi et al. |

(Continued)

FOREIGN PATENT DOCUMENTS

| JP | 543194 U | 1/1979 |
| JP | 5978972 U | 5/1984 |

(Continued)

OTHER PUBLICATIONS

International Search Report of PCT/JP2018/025138 dated Oct. 2, 2018.

*Primary Examiner* — Eric S. McCall
*Assistant Examiner* — Timothy P Graves
(74) *Attorney, Agent, or Firm* — Mattingly & Malur, PC (57) ABSTRACT

Uneven wear causes degradation of the individual parts of a syringe pump. Specifically, a seal piece composed of a soft material is easily damaged by uneven wear. To solve this problem, an automatic analysis device has a syringe pump that feeds and aspirates a liquid into and from a dispensing unit. The syringe pump has a syringe tube that stores a liquid, a plunger that moves up and down in the syringe tube, a plunger upper pressing component that contacts the plunger, a motive force transmitting part that transmits motive force to the plunger via the plunger upper pressing component, and a plunger lower pressing component that contacts the motive force transmitting part. The plunger upper pressing component and the motive force transmitting part make point contact with each other, and the motive force transmitting part and the plunger lower pressing component make point contact with each other.

9 Claims, 13 Drawing Sheets

(56) References Cited

U.S. PATENT DOCUMENTS

| | | | |
|---|---|---|---|
| 5,700,959 | A | 12/1997 | Homberg |
| 2005/0214139 | A1* | 9/2005 | Aso ..................... F04B 53/147 417/415 |
| 2017/0128932 | A1* | 5/2017 | Ito ..................... G01N 35/1081 |
| 2019/0239910 | A1* | 8/2019 | Brady ................... A61B 17/22 |

FOREIGN PATENT DOCUMENTS

| | | |
|---|---|---|
| JP | 02-49973 A | 2/1990 |
| JP | 10-503426 A | 3/1998 |
| JP | 11-351136 A | 12/1999 |

* cited by examiner

AUTOMATIC ANALYSIS DEVICE WITH SYRINGE PUMP

TECHNICAL FIELD

The present invention relates to an automatic analysis device configured to perform quantitative and qualitative analysis on biological samples such as blood and urine, and more particularly to an automatic analysis device including a syringe pump.

BACKGROUND ART

In an automatic analysis device, in order to perform component analysis on biological samples such as serum and urine (hereinafter referred to as samples), a sample and a reagent are reacted, and a change in color tone or turbidity caused thereby is optically measured by a photometric unit such as a spectrophotometer.

In order to react the sample and the reagent, it is necessary to perform dispensation from a container in which the sample and the reagent are contained into a reaction container. Accordingly, the automatic analysis device includes a dispensing device configured to automatically aspirate and dispense the sample or the reagent (hereinafter, generally referred to as a liquid) from the container in which the sample and the reagent are contained into the reaction container.

In a liquid dispensing unit configured to aspirate and dispense the sample by a syringe pump, dispensing performance and life of each part are influenced by a number of components constituting the syringe pump. Particularly, the syringe pump includes a seal component for each part with a plunger as one of limited-life products.

The seal component is generally made of a soft material such as a resin, and seals the liquid in a syringe while receiving sliding resistance when the plunger is operated. When the seal component is damaged due to uneven wear, liquid leakage from the syringe and change in dispensed liquid volume due to pressure loss occur, which may be a factor in a failure of providing an accurate analysis result. In PTL 1, a plunger pump configured to prevent a contact surface of a plunger from hitting an edge of a cam by varying and sliding the contact surface of the plunger with respect to the cam, thereby preventing early wear of the members.

CITATION LIST

Patent Literature

PTL 1: JP-A-11-351136

SUMMARY OF INVENTION

Technical Problem

Recently, processing capacity of the automatic analysis device has been greatly improved, and a speed improvement of an associated operation unit is to be achieved. In addition, in recent years, there are also some facilities, such as large hospitals and inspection centers, in which an application of operating the automatic analysis device is continued for 24 hours, and the operating time of the device is getting longer. As a result of the above, a deterioration rate of each part is increased, leading to troublesome maintenance work. Accordingly, in order to lengthen a maintenance cycle of the automatic analysis device, extending the life of the components of each part has become a major issue. Particularly, recent automatic analysis devices are equipped with a large number of syringe pumps used to feed various liquids, and maintenance work of replacing a seal piece is generally required once every few months for the syringe pump to ensure performance of the syringe pumps.

As a main factor of deterioration of each part constituting the syringe pump, the uneven wear of the seal piece which seals the liquid in the syringe pump is mentioned. The syringe pump is composed of many components, and tolerances and backlashes of each part lead to bias during driving, which are one cause of the uneven wear of the components in the syringe pump. In particular, the seal piece made of the soft material is likely to be damaged due to the uneven wear. That is, the period for replacing the seal piece can be greatly extended by preventing the occurrence of the uneven wear.

Solution to Problem

To solve the above-described problems, the invention provides an automatic analysis device including: a dispensing unit configured to aspirate and dispense a liquid; and a syringe pump configured to feed and aspirate a liquid into and from the dispensing unit. The syringe pump includes: a syringe tube capable of storing the liquid, a plunger capable of moving up and down in a longitudinal direction of the syringe tube; a plunger upper pressing component in contact with the plunger; a power transmission unit configured to transmit power to the plunger via the plunger upper pressing component; and a plunger lower pressing component in contact with the power transmission unit, and the plunger upper pressing component and the power transmission unit, and the power transmission unit and the plunger lower pressing component are in point contact with each other.

Advantageous Effect

By greatly reducing a moment when the plunger of the syringe pump is operated, it is possible to provide an automatic analysis device in which uneven wear is prevented by reducing an uneven load on a seal piece in the syringe pump and prolongs a maintenance cycle.

DESCRIPTION OF EMBODIMENTS

Hereinafter, embodiments of the invention will be described in detail with reference to the drawings. In addition, components having a same function are denoted by same reference symbols throughout the drawings for describing the embodiments.

First Embodiment

Figure 1:
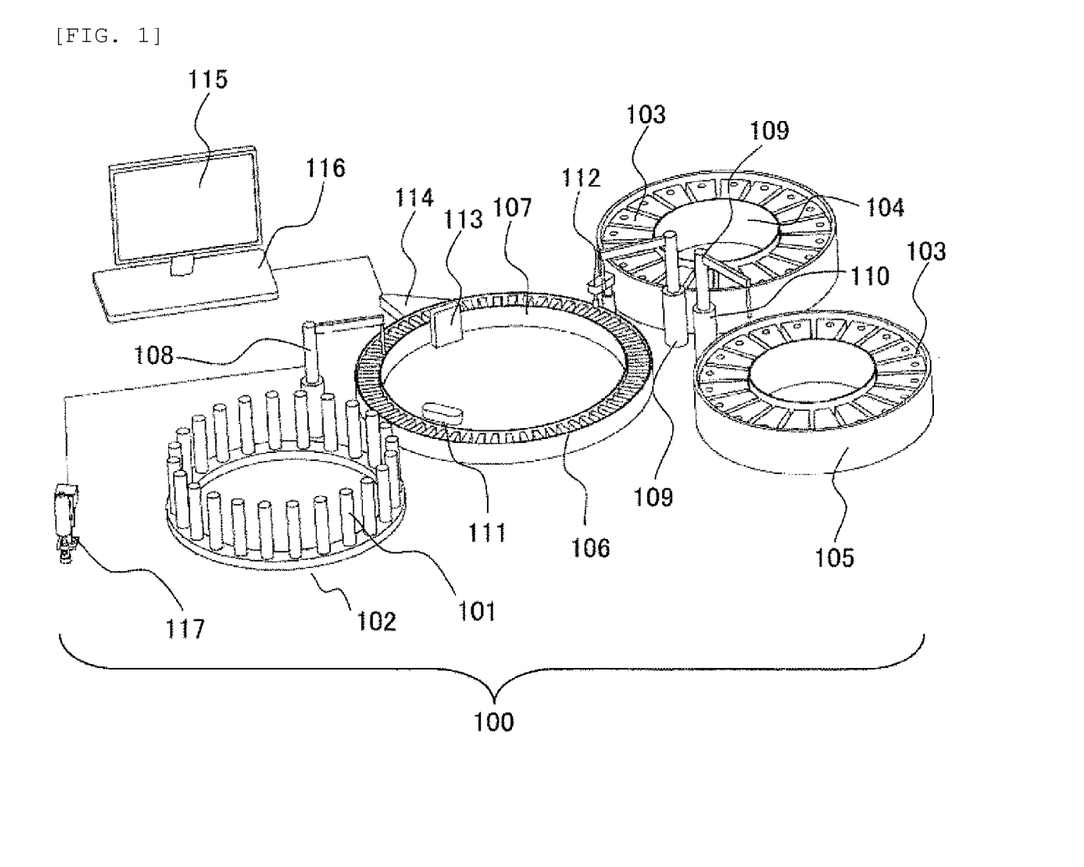
FIG. 1 is a schematic configuration diagram showing an example of an automatic analysis device according to the present embodiment.

FIG. 1 is an example of a schematic configuration diagram of an automatic analysis device to which the present embodiment is applied. In FIG. 1, an automatic analysis device 100 includes: a sample disk 102 capable of mounting a plurality of blood collection tubes (sample containers) 101 for holding samples; a first reagent disk 104 and a second reagent disk 105 capable of mounting a plurality of reagent containers 103 for holding reagents; and a reaction disk 107 with a plurality of reaction containers 106 disposed on a circumference thereof.

The automatic analysis device also includes: a probe (sample probe) 108 configured to dispense the sample aspirated from the blood collection tube 101 into the reaction container 106; a first reagent probe 109 configured to dispense the reagent aspirated from the reagent container 103 in the first reagent disk 104 into the reaction container 106; and a second reagent probe 110 configured to dispense the reagent aspirated from the reagent container 103 in the second reagent disk 105 into the reaction container 106.

The automatic analysis device further includes: a stirring device 111 configured to stir a liquid in the reaction container 106; a container cleaning mechanism 112 configured to clean the reaction container 106; alight source 113 provided near an inner circumference of the reaction disk 107; a spectrometric detector 114; a computer 115 connected to the spectroscopic detector 113; and a controller 116 configured to control an operation of the entire automatic analysis device and to exchange data with the outside.

The sample probe 108 is connected to a corresponding syringe pump 117 through a dispensing path. Although not shown in FIG. 1, syringe pumps corresponding to probes of the sample probe 108, the first reagent probe 109, and the second reagent probe 110 are connected to the automatic analysis device 100 through a flow path.

Figure 2:
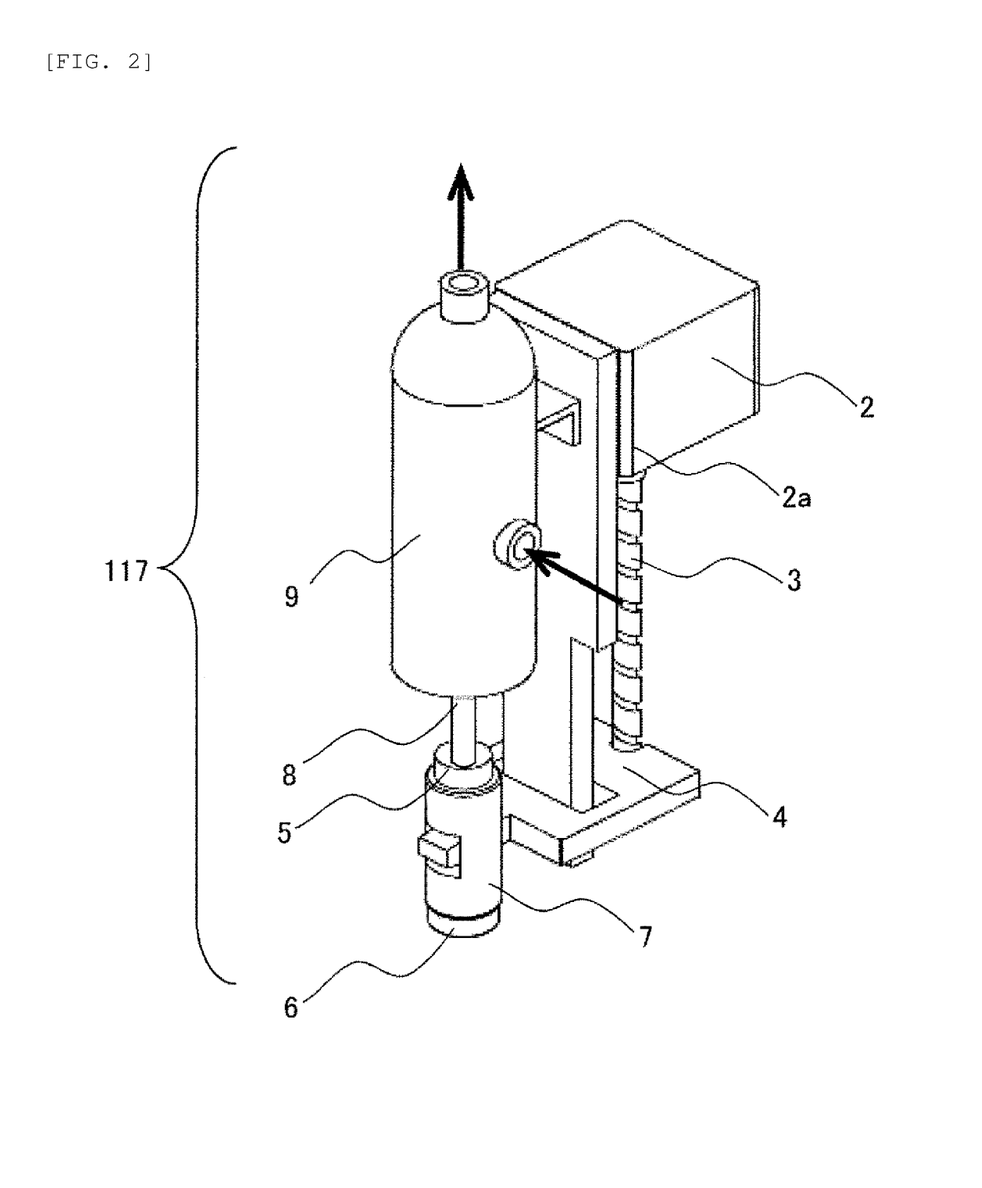
FIG. 2 is an external view showing an example of a syringe pump to which a first embodiment is applied.
Figure 3:
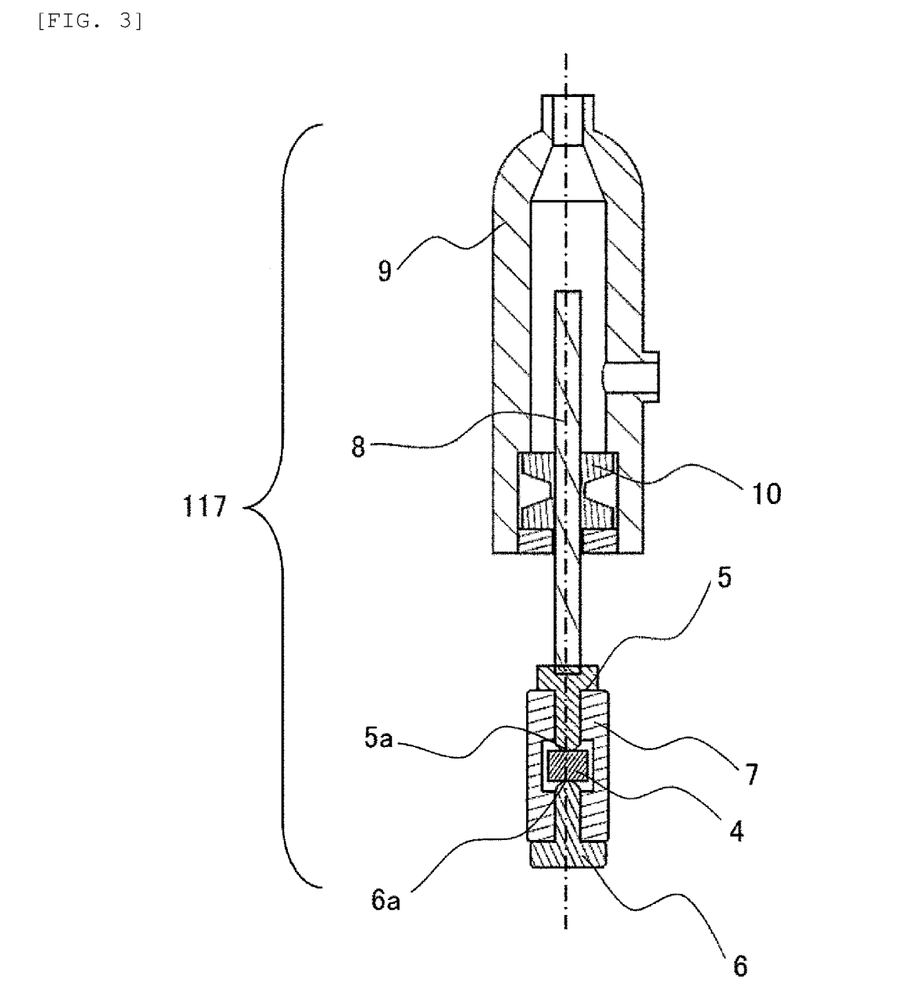
FIG. 3 is a sectional view of the syringe pump shown in FIG. 1, taken along a central axis of a plunger.
Figure 4:
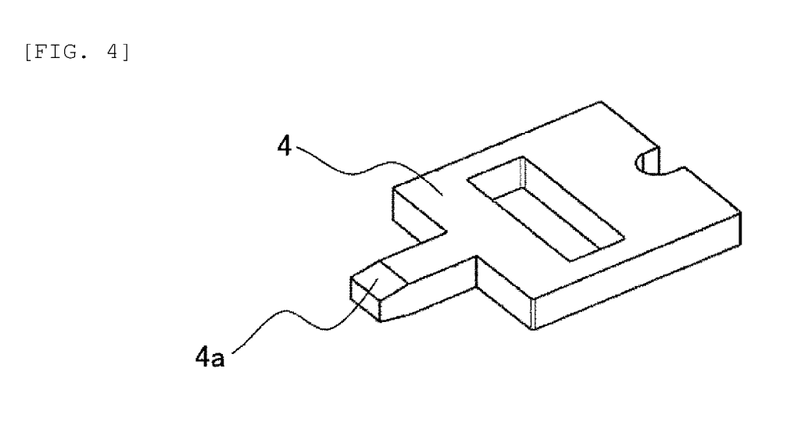
FIG. 4 is a front perspective view of a power transmission plate according to the first embodiment.

FIG. 2 shows an external view of the syringe pump of the present embodiment, and FIG. 3 shows an axial sectional view taken along a central axis of a plunger. The syringe pump 117 in the automatic analysis device includes: a syringe tube 9 capable of storing a liquid therein; a plunger 8 capable of moving up and down in a longitudinal direction of the syringe tube 9; a plunger upper pressing component 5 in contact with the plunger 8; a power transmission unit 4 configured to transmit power to the plunger 8 via the plunger upper pressing component; and a plunger lower pressing component 6 in contact with the power transmission unit 4. When the plunger 8 moves up and down in the syringe tube 9, an internal volume of the syringe tube 9 is changed, and the liquid is aspirated and dispensed. Arrows in the figure indicate a flow direction of the liquid inside the syringe tube 9. The syringe pump 117 is provided with a motor 2, and a rotational force of the motor 2 is transmitted to a power transmission plate 4 by a rotation transmission unit 3 that can be connected to the motor 2 via a reduction gear. Then, the rotational force of the motor 2 transmitted to the power transmission plate 4 is transmitted to the plunger 8 through the plunger upper pressing component 5 and the plunger lower pressing component 6 configured to move the plunger up and down. Accordingly, an aspiration/dispensation operation of the syringe can be performed. Here, a shape of the power transmission plate 4 is shown in FIG. 4. As shown in FIG. 4, a tip portion 4a of the power transmission plate 4 has an inclined structure that becomes thinner in a direction of the plunger. When the inclined structure is provided, an operation of replacing the syringe tube 9 becomes easy.

The power transmission plate 4 configured to transmit the rotational force from the motor 2 and the upper pressing component 5 of the plunger 8 configured to transmit a force when the plunger 8 moves up are in point contact with each other at one point of a contact part 5a as shown in FIG. 3. In addition, the power transmission plate 4 and the lower pressing component 6 of the plunger 8 configured to transmit a force when the plunger 8 moves down are in point contact with each other at one point of a contact part 6a as shown in FIG. 3. Further, the contact part 5a and the contact part 6a are provided on a moving axis of the plunger 8. The upper pressing component 5 of the plunger 8 and the lower pressing component 6 of the plunger 8 are fixed by a connecting component 7. The connecting component 7 has an upper hole in which the plunger upper pressing component 5 is inserted and fixed from an upper side, and a lower hole in which the lower pressing component 6 is inserted and fixed from a lower side, but the upper hole and lower hole are disposed on the moving axis of the plunger 8. In order to dispose the upper hole and the lower hole on the same axis in the connecting component 7, it is desirable that these holes are processed in a consistent operation. The upper hole and the lower hole in the figure are simple cylindrical holes, but as long as the upper hole and the lower hole fix the upper component and lower component configured to press the plunger, both holes should just be provided on the moving axis of the plunger 8 regardless of the shape. Therefore, there is no problem even if the shape of the hole is, for example, a polygon.

When the plunger 8 moves up and down, the power transmission plate 4 and the plunger upper and lower pressing components are in contact with each other, whereas the points where the force is transmitted are the contact part 5a and the contact part 6a, and the contact part is on the moving axis of the plunger. Accordingly, when the plunger moves, no moment is generated with respect to the plunger in the movement. In the syringe pump 117, a seal piece 10 is attached between the plunger 8 and the syringe tube 9 such that the liquid inside does not leak due to the operation of the plunger 8. When the plunger 8 operates, the plunger 8 operates while sliding with the seal piece 10. The seal piece 10 is generally made of a soft material such as a resin, and since an inner diameter of the seal piece 10 is set to be smaller than an outer diameter of the plunger 8, the contents in the syringe tube 9 do not leak even when the plunger 8 moves up and down. Since a form of the present embodiment is realized, no uneven load on the seal piece 10 due to the moment by the plunger 8 is generated. As a result, the uneven wear of the seal piece 10 can be significantly delayed. In addition, the replace timing of the seal piece due to the uneven wear of the seal piece 10 can be delayed.

Figure 5:
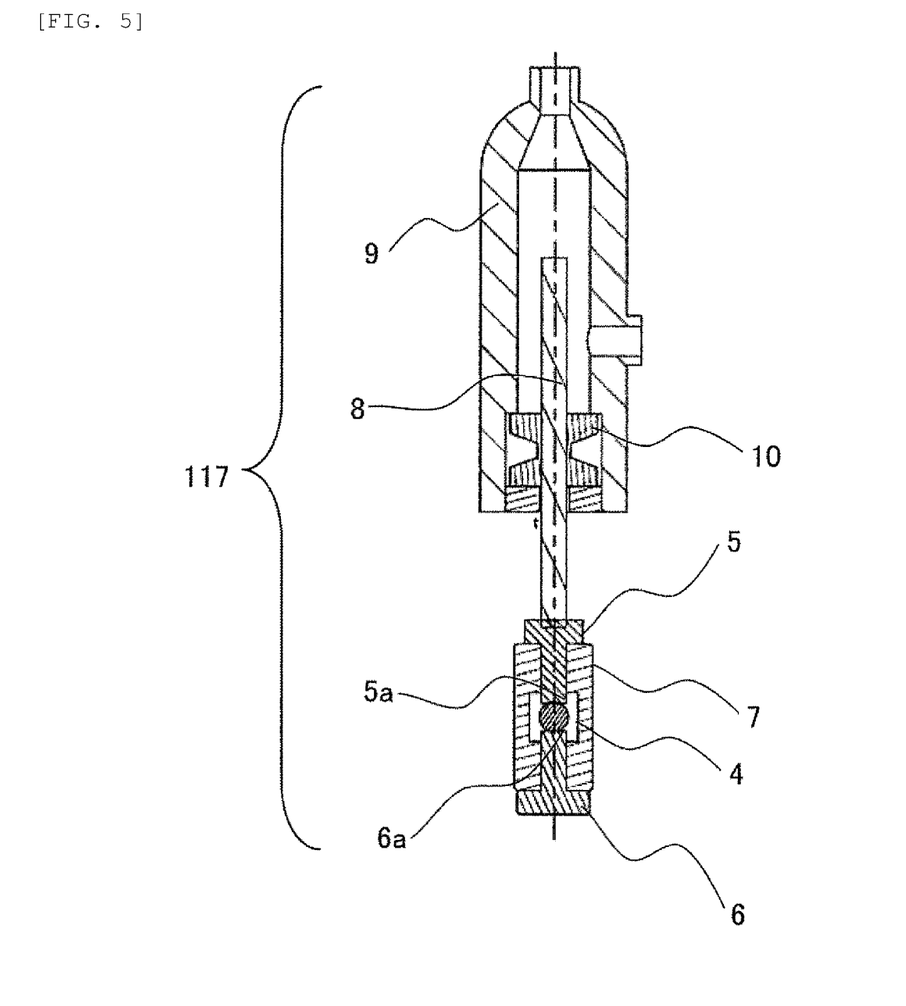
FIG. 5 is a sectional view taken along the central axis of the plunger of the syringe pump according to the first embodiment.

In addition, in the present embodiment, the contact part 5a and the contact part 6a of the plunger upper and lower pressing component in contact with the power transmission plate 4 are spherical. However, as long as both contact parts are in point contact with the power transmission plate 4, and the contact parts 5a, 6a of the plunger 8 and the upper and lower pressing components are on the moving axis of the plunger 8, the contact part may be in any shape. For example, the tip portion thereof may be a cone or a polygonal shape. On the other hand, for example, the power transmission plate 4 may be spherical as shown in FIG. 5, and the power transmission unit of the plunger may be a flat surface. The power transmission plate 4 and the plunger 8 and the plunger pressing components 5 and 6 may be made of any material as long as they are not soft materials that can be easily deformed. Examples of the material include metals and ceramics.

Figure 6:
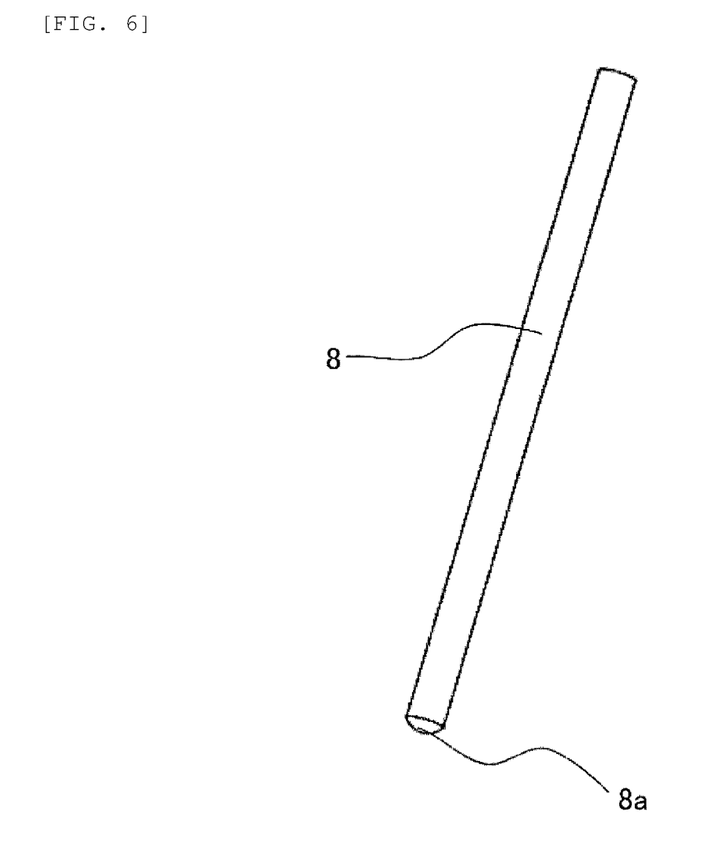
FIG. 6 is an external view showing an example of a plunger shape in the first embodiment.
Figure 7:
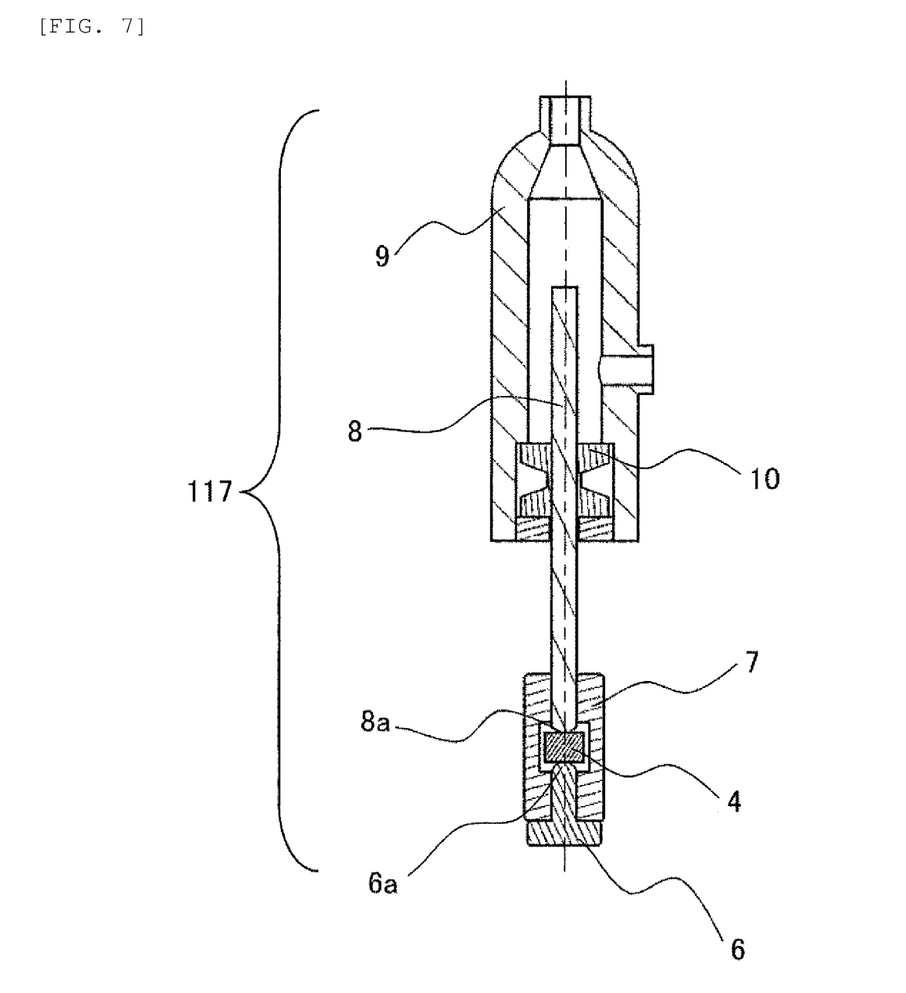
FIG. 7 is a sectional view taken along the central axis of the plunger of the syringe pump according to the first embodiment.

In addition, in the present embodiment, the plunger upper pressing component 5 and the plunger 8 are separate components, but the two can also be a single component as the same component. In this case, as shown in FIG. 6, for example, a plunger pressing component 8a is formed by processing one end of the plunger 8 into a shape that may be in contact with other components in point contact on a hemisphere or the like. FIG. 7 shows a sectional view of the syringe pump 117 in an axial direction of the plunger 8 when one end of the plunger 8 as shown in FIG. 6 is processed into the shape that may be in contact with other components in point contact on a hemisphere or the like.

Figure 8:
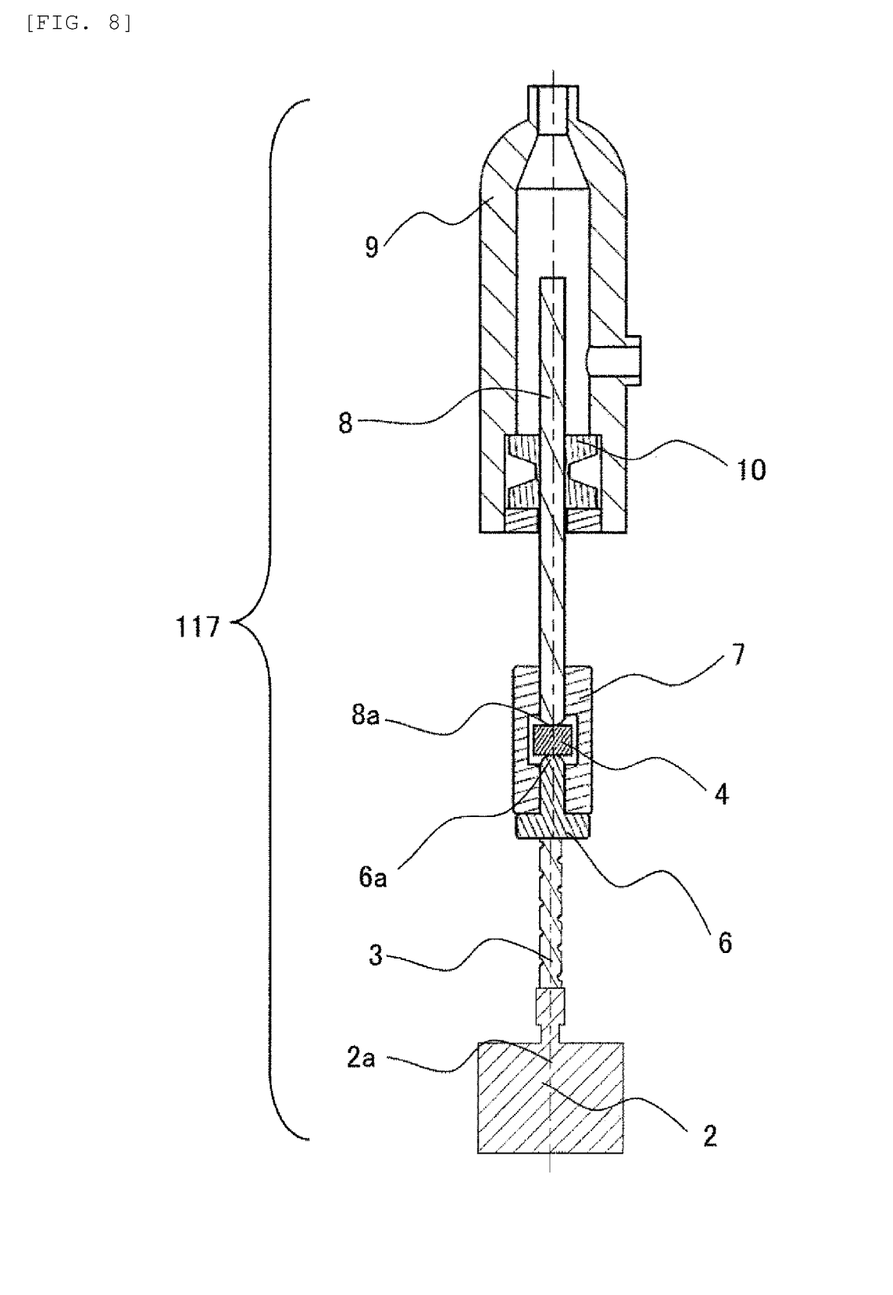
FIG. 8 is a sectional view taken along the central axis of the plunger of the syringe pump according to the first embodiment.

In addition, in the present embodiment, the plunger 8 and a rotating axis 2a of the motor are not on the same axis, but in order to implement the present embodiment, the rotating axis 2a of the motor and the moving axis of the plunger 8 also may be provided on the same axis as shown in FIG. 8.

Figure 9:
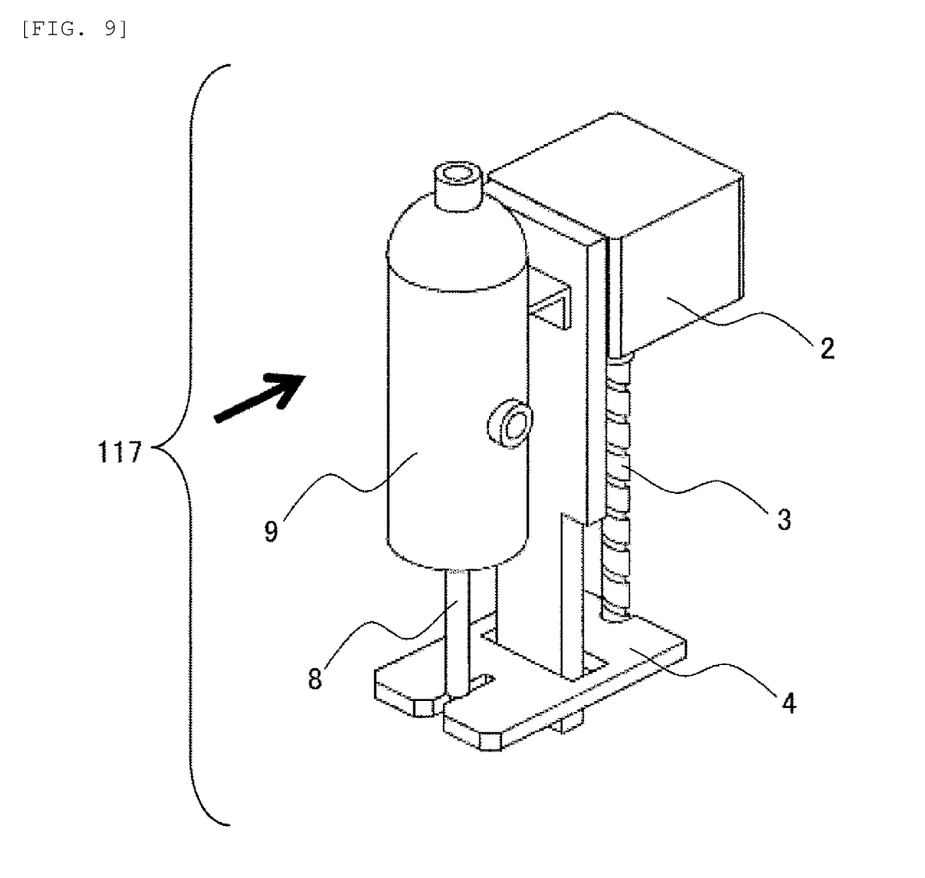
FIG. 9 is an external view showing an example of a syringe pump different from the present embodiment.
Figure 10:
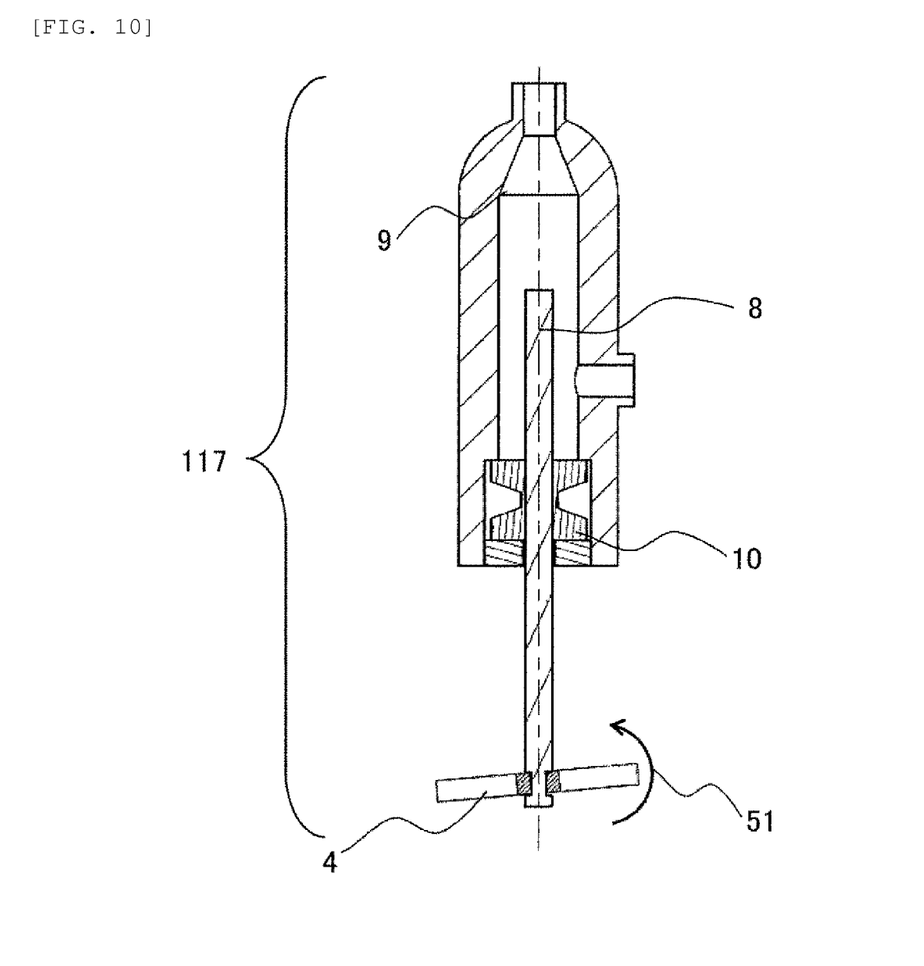
FIG. 10 is a sectional view taken along a central axis of a plunger of the syringe pump shown in FIG. 9.

For comparison with the present embodiment, examples of syringes different from the present embodiment are shown in FIGS. 9 and 10. FIG. 9 is an external view of a syringe pump different from the present embodiment. FIG. 10 is a sectional view as seen from the direction of the arrow passing through the central axis of the plunger constituting the syringe pump of FIG. 9. The end of the plunger has a shape that is sandwiched between the power transmission plate 4, and depending on a tolerance of each component on the structure, the power transmission plate 4 is not completely parallel to a horizontal surface. When the plunger operates, as shown in FIG. 10, a moment 51 is generated with the contact point of the plunger 8 and the power transmission plate 4 as a base point due to the inclination of the component. The moment 51 generated by the operation of the plunger is transmitted to the seal piece 10 provided inside the syringe tube 9, and an uneven load is applied to the seal piece 10. Since the load concentrates on a certain location with respect to the seal piece 10, uneven wear occurs, which may cause damage to the seal piece 10.

Second Embodiment

An example of a syringe pump capable of reducing the influence of an impact load applied to the power transmission plate and the plunger pressing components in a configuration the same as the configuration of the first embodiment will be described.

There may be a small gap between the plunger upper pressing component 5 or the plunger lower pressing component and the power transmission plate 4 for ensuring assemblability. In such a case, the power transmission plate 4 moves by the gap, and when the power transmission plate 4 is in contact with the plunger upper pressing component 5 and the plunger lower pressing component 6, an impact load is applied due to the contact of respective components. The impact load can cause wear and damage to the power transmission plate 4, the plunger upper pressing component 5 and the plunger lower pressing component 6, and the plunger 8 and the seal piece 10.

Figure 11:
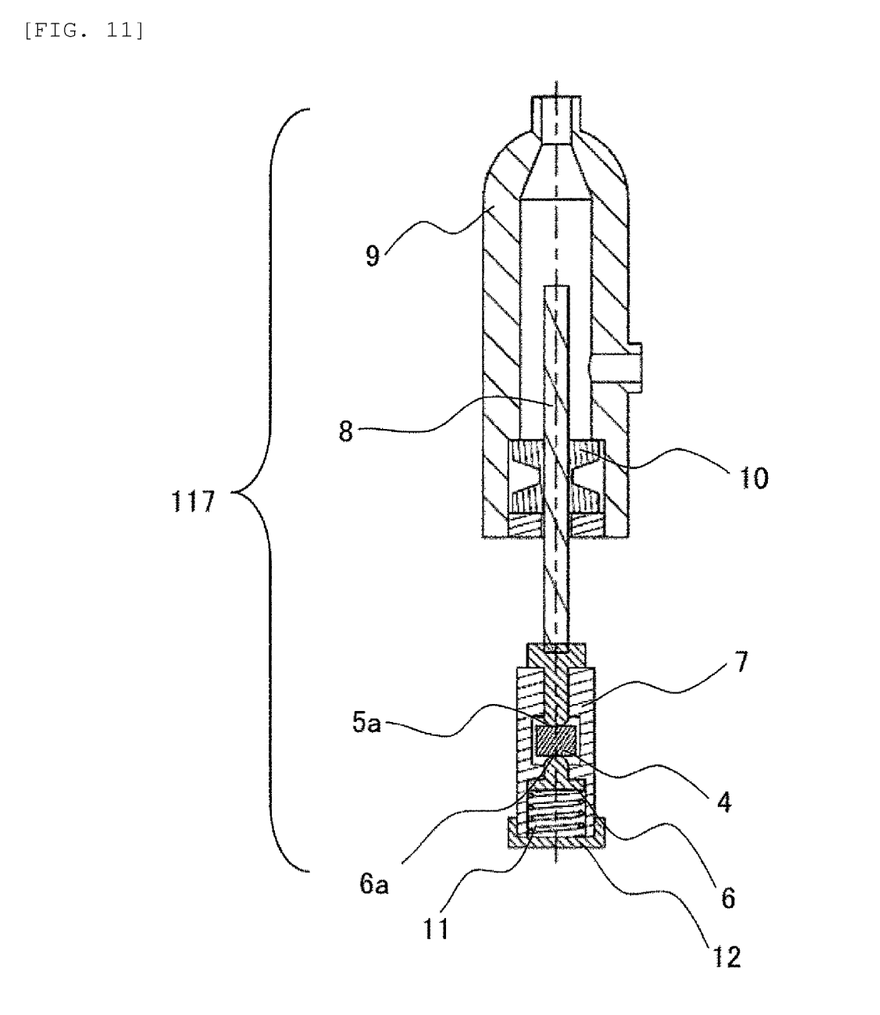
FIG. 11 is a sectional view taken along a central axis of a plunger of a syringe pump in a second embodiment.

Therefore, for example, an example shown in FIG. 11 can be considered as a method for preventing the impact load caused by such a small gap. In the syringe pump of FIG. 11, an elastic body 11 such as a spring is provided in a pressing fixing member 7. The elastic body 11 makes it possible to press the plunger lower pressing component 6 against the power transmission plate 4. Accordingly, the small gap can be eliminated as much as possible, and the impact load can be prevented.

The elastic body 11 is compressed by a lowermost pressing component 12 and the elastic body 11 is designed to have a compressive force larger than a maximum sliding resistance that can be generated between the plunger and the seal piece. Therefore, even when the plunger is operated, no gap is generated between the plunger upper pressing component 5 or the plunger lower pressing component 6 and the power transmission plate 4. In addition, when the syringe tube 9 is taken out of the syringe pump 117 during a regular maintenance, the compressive force of the elastic body 11 is removed by removing the compressive force by the lowermost pressing component 12.

Figure 12:
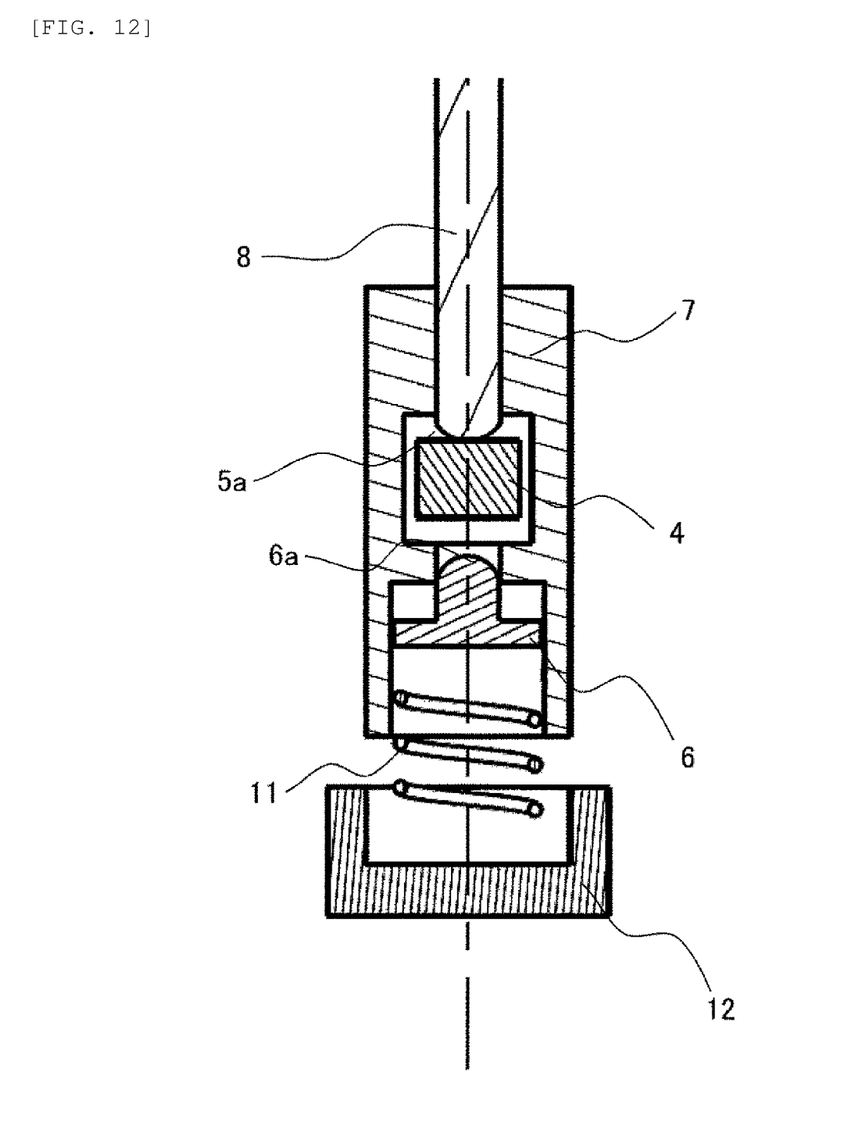
FIG. 12 is a sectional view taken along the central axis of the plunger of the syringe pump according to the second embodiment.

When the compressive force of the elastic body 11 is removed, a gap is formed between the plunger upper pressing component 5 or the plunger lower pressing component 6 and the power transmission plate 4, and the syringe tube 9 can be easily mounted and removed. FIG. 12 shows a schematic diagram when the elastic body 11 is removed.

Figure 13:
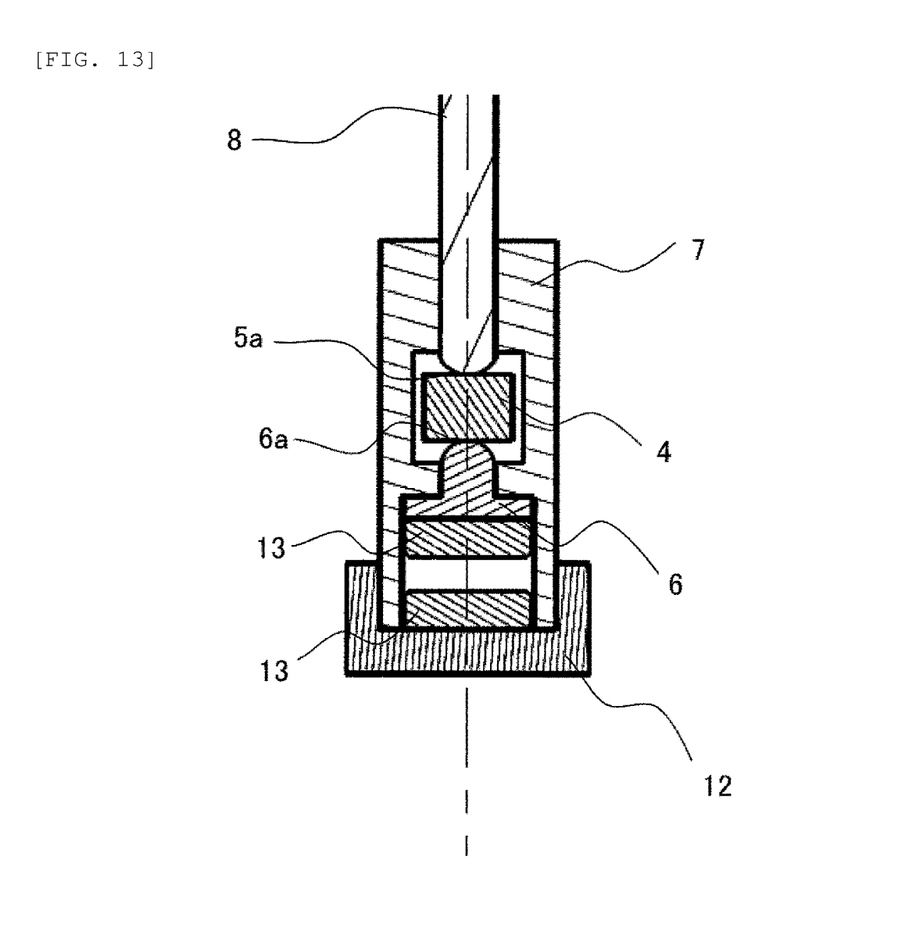
FIG. 13 is a sectional view taken along the central axis of the plunger of the syringe pump according to the second embodiment.

By having the above form, it is possible to implement the syringe pump 117 in which no impact load is generated on each part when the plunger is operated. As an effect, it is possible to prevent wear and damage to each part of the syringe pump due to the impact load. In the present embodiment, the gap between the plunger pressing components 5, 6 and the power transmission plate 4 is eliminated by using the elastic body, but it is not necessary to use the elastic body as long as the pressing component is pressed with a force larger than the maximum sliding resistance. For example, there is an example using a magnetic body 13. FIG. 13 shows a schematic diagram in which the present embodiment is implemented using a magnetic body. By disposing two magnetic bodies 13 in a direction in which a repulsive force is generated, the pressing component 6 is pressed against the power transmission plate 4, and the gap between the pressing components 5, 6 and the power transmission plate 4 is eliminated.

REFERENCE SIGN LIST

2 motor
2a rotating axis of motor
3 rotation transmission unit
4 power transmission unit
4a tip of power transmission unit
5 plunger upper pressing component 5a contact point of plunger upper pressing component and power transmission unit
6 plunger lower pressing component
6a contact point of plunger lower pressing component and power transmission unit
7 connecting component of plunger pressing components
8 plunger
8a contact point of plunger and power transmission unit
9 syringe tube
10 seal piece
11 elastic body
12 lowermost pressing member
13 magnetic body
100 automatic analysis device
101 blood collection tube (sample container)
102 sample disk
103 reagent container
104 first reagent disk
105 second reagent disk
106 reaction container
107 reaction disk
108 dispensing probe (sample probe)
109 first reagent probe
110 second reagent probe
111 stirring device
112 container cleaning mechanism
113 light source
114 spectrometric detector
115 computer
116 controller
117 syringe pump

The invention claimed is:

1. An automatic analysis device, comprising:
a dispensing unit configured to aspirate and dispense a liquid; and
a syringe pump configured to feed and aspirate a liquid into and from the dispensing unit,
wherein the syringe pump includes:
a syringe tube capable of storing a liquid;
a plunger capable of moving up and down in a longitudinal direction of the syringe tube;
a plunger upper pressing component in contact with the plunger;
a power transmission unit configured to transmit power to the plunger via the plunger upper pressing component; and
a plunger lower pressing component in contact with the power transmission unit,
wherein the plunger upper pressing component and the power transmission unit are in direct contact,
wherein the power transmission unit and the plunger lower pressing component are in direct contact with each other and the direct contact is fixed,
wherein the power transmission unit is disposed between the plunger upper pressing component and the plunger lower pressing component in an axial direction of the plunger.

2. The automatic analysis device according to claim 1, wherein
the plunger upper pressing component includes a first contact part in direct contact with the power transmission unit, and the plunger lower pressing component includes a second contact part in direct contact with the power transmission unit, and
the first contact part and the second contact part are on a moving axis of the plunger.

3. The automatic analysis device according to claim 2, wherein
the first contact part and the second contact part have a spherical shape.

4. The automatic analysis device according to claim 2, wherein
the power transmission unit has a spherical shape.

5. An automatic analysis device, comprising:
a dispensing unit configured to aspirate and dispense a liquid; and
a syringe pump configured to feed and aspirate a liquid into and from the dispensing unit,
wherein the syringe pump includes:
a syringe tube capable of storing a liquid;
a plunger capable of moving up and down in a longitudinal direction of the syringe tube;
a power transmission unit configured to transmit power to the plunger; and
a plunger lower pressing component in contact with the power transmission unit,
wherein the plunger and the power transmission unit are in direct contact,
wherein the power transmission unit and the plunger lower pressing component are in direct contact with each other and the direct contact is fixed, and
wherein the power transmission unit is between the plunger lower pressing component and the plunger in an axial direction of the plunger.

6. The automatic analysis device according to claim 5, wherein
portions of the plunger and the plunger lower pressing component which are in contact with the power transmission unit have a spherical shape.

7. The automatic analysis device according to claim 5, wherein
the plunger lower pressing component is connected to a motor, and a rotating axis of the motor and a moving axis of the plunger are coaxial.

8. The automatic analysis device according to claim 3, wherein
the syringe pump further includes an elastic body in contact with the plunger lower pressing component.

9. The automatic analysis device according to claim 3, wherein
the syringe pump further includes a magnetic body in contact with the plunger lower pressing component.

* * * * *